Oct. 20, 1953   J. S. DZIENGIEL, JR   2,655,955
ANGULAR AND CROSS CUTTING POWER SAW
Filed June 19, 1951   2 Sheets-Sheet 1

INVENTOR
JOHN S. DZIENGIEL, JR

BY
McMorrow, Berman & Davidson
ATTORNEYS

Oct. 20, 1953    J. S. DZIENGIEL, JR    2,655,955
ANGULAR AND CROSS CUTTING POWER SAW
Filed June 19, 1951    2 Sheets-Sheet 2
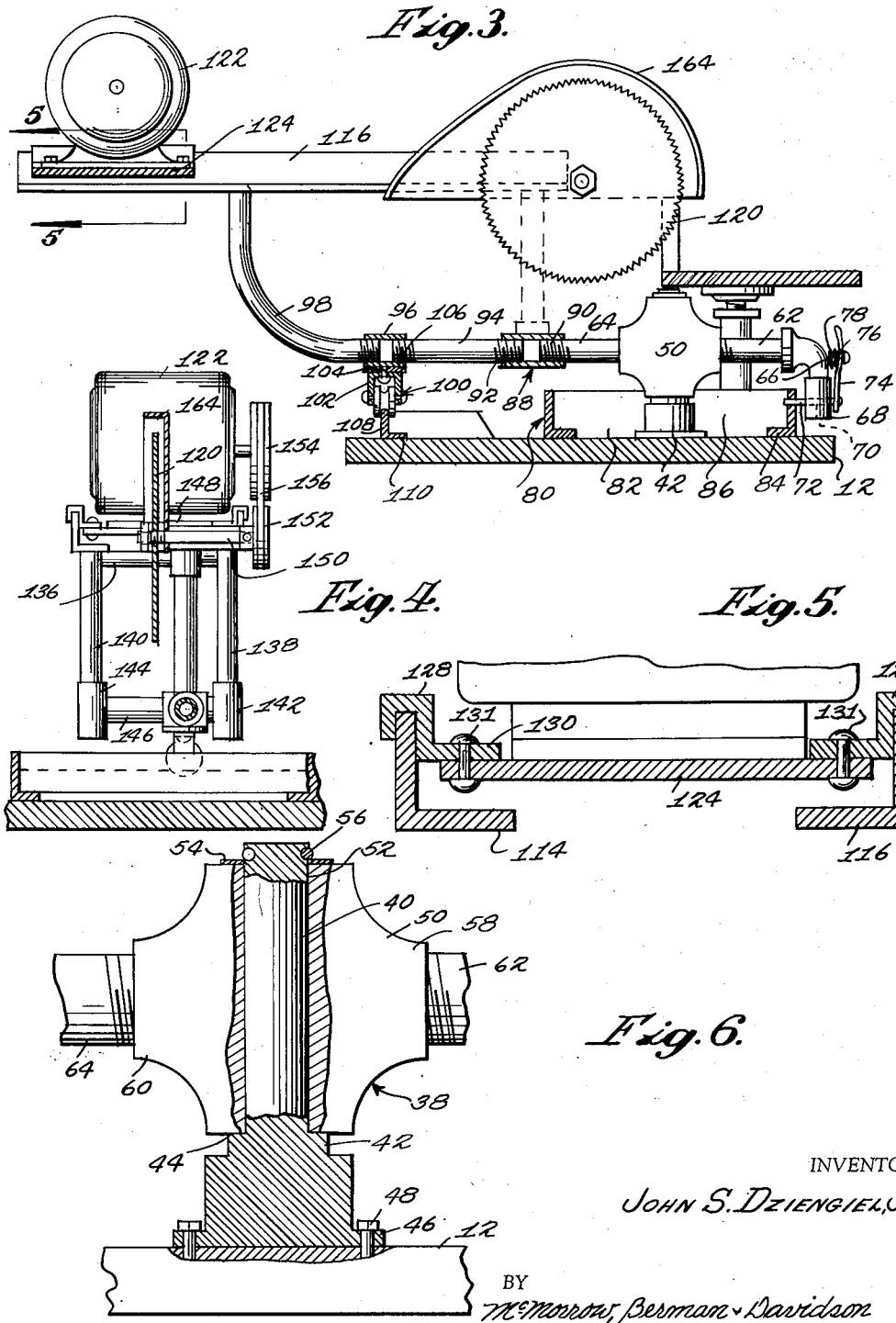
INVENTOR
JOHN S. DZIENGIEL, JR
BY
ATTORNEYS Patented Oct. 20, 1953

2,655,955

UNITED STATES PATENT OFFICE 2,655,955

ANGULAR AND CROSS CUTTING POWER SAW

John Stanley Dziengiel, Jr., Whiting, Ind.

Application June 19, 1951, Serial No. 232,324

2 Claims. (Cl. 143—6)

This invention appertains to improvements in woodworking machine, and more particularly to an improved power saw assembly which can be conveniently and easily adjusted for making crosscuts, dado cuts, bevel cuts, and mitre cuts.

A primary object of this invention is to provide a power saw of the character indicated above which is vertically arranged, and is movable in different planes, the power saw including a carriage, which supports a drive motor and supports the saw, which is connected to the drive motor, the carriage being reciprocable in a horizontal plane and a supporting track for the carriage being pivotal about a vertical axis.

Another object of this invention is to provide an adjustable power saw unit, involving a vertically adjustable work table, whereby a workpiece may be vertically adjusted relative to the vertically arranged circular saw and the saw may be disposed in various angular relations to the workpiece for forming various cuts therein.

A further object of this invention is to provide a compact, light weight and inexpensive power saw assembly, wherein the power saw can be easily adjusted into different angular and planar relation with a workpiece.

These and ancillary objects and structural features of merit are attained by this invention, the preferred embodiment of which is set forth in the following description and illustrated in the accompanying drawings, wherein:

Figure 3 is a longitudinal vertical sectional view taken on line 3—3 of Figure 2;

Figure 4 is a transverse sectional view taken on line 4—4 of Figure 2;

Figure 5 is an enlarged detail sectional view taken on line 5—5 of Figure 3, and Figure 6 is an enlarged vertical sectional view of a turret supporting means for the frame.

Figure 1:
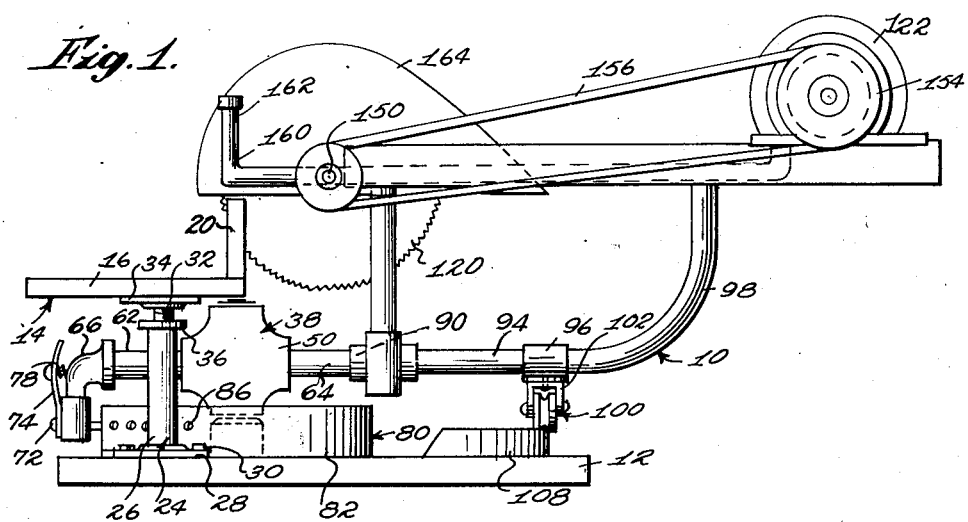
Figure 1 is a side elevational view of a power saw constructed in accordance with this invention.

With continued reference to the accompanying drawings, the illustrated power saw 10 includes a flat base plate 12, which can be disposed on any horizontal supporting surface.

A work support 14 is provided and includes a flat horizontally disposed plate 16, which has angularly spaced lines scribed on its upper surface, as at 18, and which is provided with an upstanding ledge 20, the ledge being formed with a center opening 22 for the reception of a saw.

Supporting jacks 24 are mounted on the base and engage the plate 16 to maintain the plate in adjusted positions above the base, the plate being arranged parallel with the base. The supporting jacks 24, include posts 26, formed on their lower ends with lateral mounting flanges 28, which are fixed by bolts 30 to the base. Screw shafts 32 are formed at their upper outer ends with mounting flanges 34, which are suitably fixed to the under side of the plate 16, the shafts being telescopically arranged within the posts 26 and engaged by adjusting nuts 36, whereby rotation of the nuts will effect upward or outward movement of the screw shafts relative to the posts and, correspondingly, raise the plate 16 to the desired position above the base 12, the plate 16 being adjustable for dado cutting or the formation of similar cuts in a workpiece, which is seated on the plate 16, with one side edge thereof abutting against the ledge 20.

A turret assembly 38 is mounted on the base, the assembly including an upstanding supporting post 40 (Figure 6), which is formed on its lower end with a diametrical enlargement 42, defining a lateral shoulder 44. A mounting flange 46 is formed on the enlargement and fasteners 48 are engaged in suitable openings in the mounting flange for mounting the flange on the base, so that the post 40 extends upwardly therefrom. A block 50 is rotatably disposed on the post 40, the block being formed with a vertical bore 52 engaged on the post, the lower end of the block rotatably engaging the shoulder 44 and the upper end engaging a washer 54, which is held on the post by a retainer ring 56. The block 50 is formed with diametrically opposed internally threaded sockets 58 and 60. A tubular arm 62 is formed with opposing threaded ends, one of the ends being threaded in the socket 58, and a tubular arm 64 is provided, one of the threaded ends of the arm 64 being threaded in the socket 60, so that the tubular arms 62 and 64 are disposed in axial alignment and extend in opposite directions from the supporting block.

An elbow arm 66 is threadingly engaged on the opposing threaded end of the tubular member 62 and depends therefrom, the arm receiving a collar 68, which is fixedly circumposed on the lower end thereof. The collar 68 is formed with a transverse aperture 70 for the reception of a locking pin 72, which is carried by a lever 74. The lever 74 extends upwardly from the pin at right angles thereto and is slidably engaged on a headed lug 76, which projects laterally from the arm 66. A spring 78 is circumposed on the shank of the lug and abuts against the lever and the arm 66 to bias the pin 72 to the collar 68.

A locking member 80 is provided and is mounted on the base concentric to the turret for lockingly receiving the pin 72. The locking member 80 includes a ring 82, which is formed with an interiorly extending lateral flange 84 fixedly mounted on the supporting base, the ring being formed with a series of circumferentially spaced apertures 86 for receiving the outer end of the locking pin 72.

A T-coupling 88 receives the threaded end 90 of the arm 64 and the threaded end 92 of the tubular frame bar 94, the bar 94 being affixed by means of a coupling sleeve 96 to an upwardly curved arm 98. A guide wheel 100 is swivelly carried by the coupling sleeve 96 and depends therefrom, the guide wheel including a supporting yoke 102, which is secured by a rivet 104 to a supporting plate 106 fixed to the under side of the sleeve 96. The wheel is vertically arranged and adapted for pivotal movement about a vertical axis, defined by the rivet 104, and is rotatably disposed on an arcuate guide track 108 (Figure 1). The guide track 108 is disposed concentric to the locking member and is formed with a lateral mounting flange 110 (Figure 3), which is fixed to the base.

Figure 2:
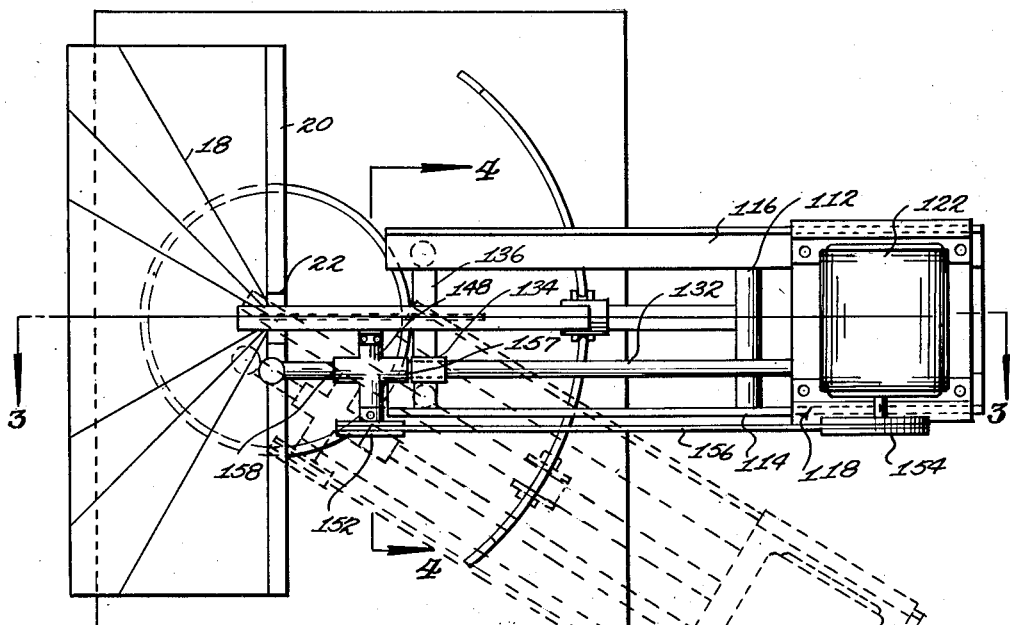
Figure 2 is a top plan view thereof.

The arm 98 terminates in a transverse supporting bar 112 (Figure 2), which supports a pair of parallel horizontally arranged tracks 114 and 116. A supporting carriage 118 is provided on which is mounted a circular vertically arranged power driven saw 120 and a motor 122 for the saw, the carriage being slidably disposed on the tracks. The carriage 118 includes a plate 124 (Figure 3), on which the motor is mounted, the plate being formed at its opposing side edges with guides 126 and 128 (Figure 5). The channel-shaped guides 126 and 128 are formed with mounting flanges 130, which are secured by rivets 131 to the sides of the plate 124, the channel guides sliding on the upper edges of the guide tracks 114 and 116. A horizontal tubular member 132 (Figure 2) is affixed to the plate and extends forwardly thereof, parallel with the tracks 114 and 116, the tubular member 132 being slidably disposed through a guide collar 134, which is carried by a bar 136. The bar 136 is secured at its ends to depending posts 138 and 140 (Figure 4), which are connected to the tracks, the posts being affixed by vertical collars 142 and 144 to a cross rod 146, which is carried by the coupling member 88.

A transverse tubular saw shaft 148 rotatably receives a driven shaft 150, which has a pulley 152 fixed on one end thereof, the opposing end of the shaft supporting the circular saw 120. The pulley 152 is drivingly connected to pulley 154, fixed on the shaft of the motor 122, by means of a drive belt 156. The tubular shaft 148 is formed with axially aligned internally threaded sockets 157 and 158, which extend laterally and in opposite directions therefrom, the socket 157 receiving the member 132 and the socket 158 receiving one end of an angular handle 160, the outer end 162 of the handle extending upwardly above the tracks and being vertically arranged for easy and convenient grasping by an operator. The saw 120 is provided with a protective hood 164, which overlies the upper portion of the saw and is carried by the tubular shaft 148.

In use, for forming a crosscut on a workpiece, disposed on the work support 14, the handle 162 is grasped and the saw 120 and motor 122 are moved forwardly on the tracks 114 and 116, so that the lower portion of the saw moves through the opening 22 in the upstanding ledge 20 of the work support and forms a crosscut in the workpiece. It will be noted that the rigid arm 132 retains the saw 120 and the motor 122 in spaced relation, so that the belt 156 is held taut, as the motor and saw are simultaneously reciprocated on the tracks 114 and 116.

For a mitre cut, the lever 76 is pressed inwardly, by grasping the lever and the arm 66, the lever moving inwardly against the urgement of the spring 78 and releasing the pin 72 from one of the selected openings 86 in the ring 82. The entire saw assembly can then be swung around the supporting post 40 as a vertical axis, until the saw 120 is disposed in the desired angular relationship with respect to a workpiece, the angular degrees scribed on the upper surface of the plate 16 assisting in the selection of the proper placement of the saw, relative to the workpiece. When the saw is positioned in the desired angle, the grip on the lever 76 is released and the pin 72 is urged by the spring 78 into locking engagement with one of the openings 86 in the ring. An operator then grasps the handle 160, standing in a position similar to the position assumed for forming crosscuts, and the handle 160 is pulled towards him.

In dado cutting, the supporting table 14 is raised by rotating the nuts 36 to raise the screw shafts 32 and position the supporting table in a raised position, with respect to the saw 120. The table is raised, depending upon the desired depth of dado, and the handle 162 is moved back and forth, to reciprocate the saw through the workpiece, the workpiece being also moved to control the depth of the cut. Of course, a rabbet blade would be substituted for the illustrated saw 120, in forming dadoes, the blade being easily mounted on the shaft 150 in a conventional manner. To form bevel cuts, the workpiece is placed on its edge and the saw is arranged relative to the end or edge of the workpiece, depending upon the angle of the desired bevel.

What is claimed is:

1. In a power saw assembly, a base, a horizontally disposed work support positioned above said base adjacent the forward end thereof and connected to said base for vertical up and down movement, an upstanding ledge extending transversely along the rearward edge of said support, there being an opening extending through said ledge, an upstanding post arranged below said support adjacent said rearward edge thereof and directly below said opening in said ledge and fixed to said base, a block surmounting said base and connected to said post for rotation therearound, a horizontally disposed arm positioned longitudinally of said base and on the rearward side of said block and having one end fixed to said block, a coupling sleeve positioned longitudinally of said base and having one end connected to the other end of said arm, an upstanding arcuate guide track positioned adjacent the rearward end of said base and concave toward said ledge and fixedly secured to said base concentric with said post, a guide wheel dependingly carried by said coupling sleeve and rollably engaging said guide track, an upstanding curved arm having the lower end connected to the other end of said coupling sleeve, a horizontally disposed supporting bar positioned more or less longitudinally of said base and secured to the upper end of said curved arm, spaced tracks extending longitudinally of and supported on said bar, a carriage mounted on said tracks for sliding movement toward and away from said ledge, a circular saw arranged longitudinally of said carriage and mounted on the forward end of said carriage for rotary movement about a horizontal axis and cutting transverse over said work support, said saw passing through the opening of said ledge when said carriage has been moved over said ledge, means on said carriage and operatively connected to said saw for effecting the rotary movement of said saw, and hand actuable means operatively connected to said carriage for effecting the sliding movement of said carriage.

2. In a power saw assembly, a base, a horizontally disposed work support positioned above said base adjacent the forward end thereof and connected to said base for vertical up and down movement, an upstanding ledge extending transversely along the rearward edge of said support, there being an opening extending through said ledge, an upstanding post arranged below said support adjacent said rearward edge thereof and fixed to said base directly below said opening in said ledge, a block surmounting said base and connected to said post for rotation therearound, a horizontally disposed arm positioned longitudinally of said base and on the rearward side of said block remote from said ledge and having one end fixed to said block, a coupling sleeve positioned longitudinally of said base and having one end connected to the other end of said arm, an upstanding arcuate guide track positioned adjacent the rearward end of said base and concave toward said ledge and fixedly secured to said base concentric with said post, a guide wheel dependingly carried by said coupling sleeve and rollably engaging said guide track, an upstanding curved arm having the lower end connected to the other end of said coupling sleeve, a horizontally disposed supporting bar positioned more or less longitudinally of said base and secured to the upper end of said curved arm, spaced tracks extending longitudinally of and supported on said bar, a carriage mounted on said tracks for sliding movement toward and away from said ledge, a circular saw arranged longitudinally of said carriage and mounted on the end of said carriage for rotary movement about a horizontal axis and cutting transverse over said work support, said saw passing through the opening of said ledge when said carriage has been moved over said ledge, means on said carriage and operatively connected to said saw for effecting the rotary movement of said saw, an upstanding ring surrounding and concentric with said post and fixed to said base, a depending elbow arm positioned longitudinally of said base and on the forward side of said block and having the upper end fixed to said block, a spring biased locking element carried by said elbow arm adjacent the lower end thereof and selectively engageable with means formed on said ring for locking said block in any selected position of its rotational movement, and hand actuable means operatively connected to said carriage for effecting the sliding movement of said carriage.

JOHN STANLEY DZIENGIEL, Jr.

References Cited in the file of this patent

UNITED STATES PATENTS

| Number | Name | Date |
|---|---|---|
| Re. 17,329 | Schmidt | June 18, 1928 |
| 766,792 | Richards | Aug. 2, 1904 |
| 1,332,713 | D'Arcy | Mar. 2, 1920 |
| 1,646,589 | Meek et al. | Oct. 25, 1927 |
| 1,691,519 | Hutchinson | Nov. 13, 1928 |
| 1,733,532 | Elliot | Oct. 29, 1929 |
| 2,071,005 | Swickard | Feb. 16, 1937 |

FOREIGN PATENTS

| Number | Country | Date |
|---|---|---|
| 264,982 | Switzerland | Feb. 16, 1950 |